Nov. 18, 1924. 1,516,301

S. KUNO

BRAKE FOR AUTOMOBILES

Filed March 22, 1924

Inventor
Shichigoro Kuno.
By A. J. O'Brien
Attorney

Patented Nov. 18, 1924.

1,516,301

UNITED STATES PATENT OFFICE.

SHICHIGORO KUNO, OF OGDEN, UTAH.

BRAKE FOR AUTOMOBILES.

Application filed March 22, 1924. Serial No. 701,058.

*To all whom it may concern:*

Be it known that I, SHICHIGORO KUNO, a subject of the Emperor of Japan, residing at Ogden, county of Weber, and State of Utah, have invented certain new and useful Improvements in Brakes for Automobiles; and I do declare the following to be a full, clear, and exact description of the invention such as will enable others skilled in the art to which it appertains to make and use the same, reference being had to the accompanying drawings and to the characters of reference marked thereon, which form a part of this specification.

This invention relates to a brake mechanism for automobiles and other vehicles.

In mountainous countries, especially, and wherever roads with steep grades are found, it is absolutely essential to safety that all vehicles and automotive vehicles in particular shall be provided with brakes that will positively stop the vehicle in an emergency. It is especially desirable that the vehicle shall be equipped with means that will be particularly well adapted to prevent a rearward movement of the machine, for it sometimes happens that the driver of an automobile fails in his attempt to shift gears on a steep up-grade and that owing to defective brakes, the machine starts moving backwards with disastrous results. At times when the roads are covered with ice, the ordinary braking devices are powerless to hold the vehicles on a steep grade, as the friction between the ice and the tires is too small to prevent slipping, even if the wheels are held against rotation.

It is the object of this invention to produce an auxiliary brake mechanism that can be attached to the chassis and which is adapted to contact directly with the ground so as to act as a positive stop against rearward movement, and which can also be employed to produce a force tending to prevent movement in a forward direction. It is also my intention to produce a device that can be employed for the purpose of preventing sidewise skidding on slippery pavements.

My invention, briefly described, comprises two parallel bars secured at their ends to the front and rear axles, and which are each provided with two legs pivotally attached thereto. These legs are adapted to be moved into a position approximately at right angles thereto. When the legs are in the last-named position their ends engage the ground. A lever is provided for controlling the legs and for exerting pressure between the ends of the legs and the ground. Stops are provided for preventing the legs from being rotated more than 90 degrees about their pivots.

In order more clearly to describe my invention, and the manner in which it operates, I shall have reference to the accompanying drawing in which the present preferred form of my invention is shown, and in which.

Figure 1:
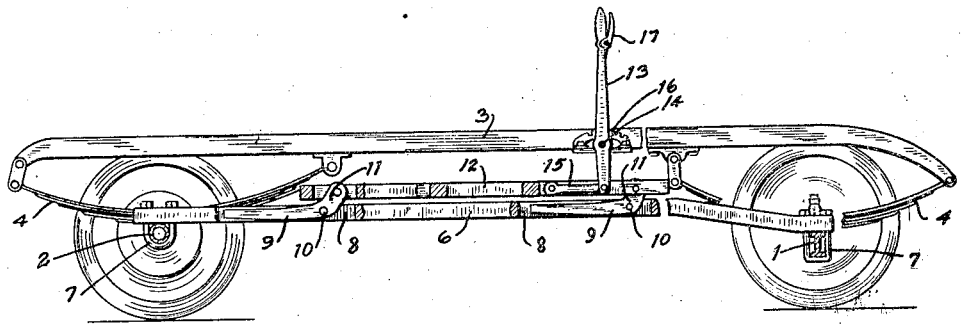
Fig. 1 is a section taken on line 1—1, Fig. 3, and shows the mechanism in inoperative position.
Figure 2:
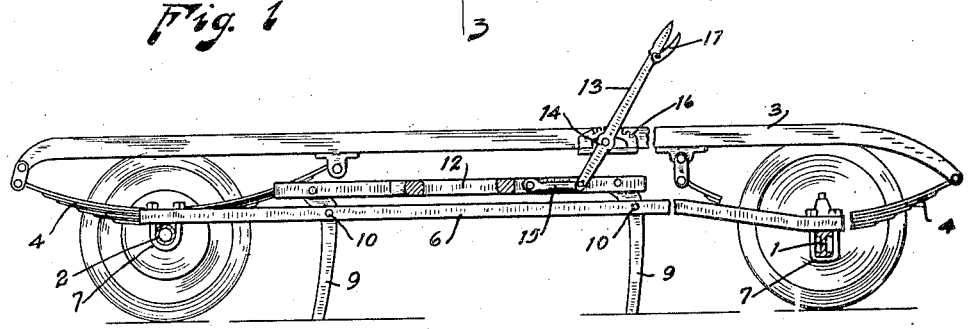
Fig. 2 is a section similar to that of Fig. 1, but shows the parts in operative position.
Figure 3:
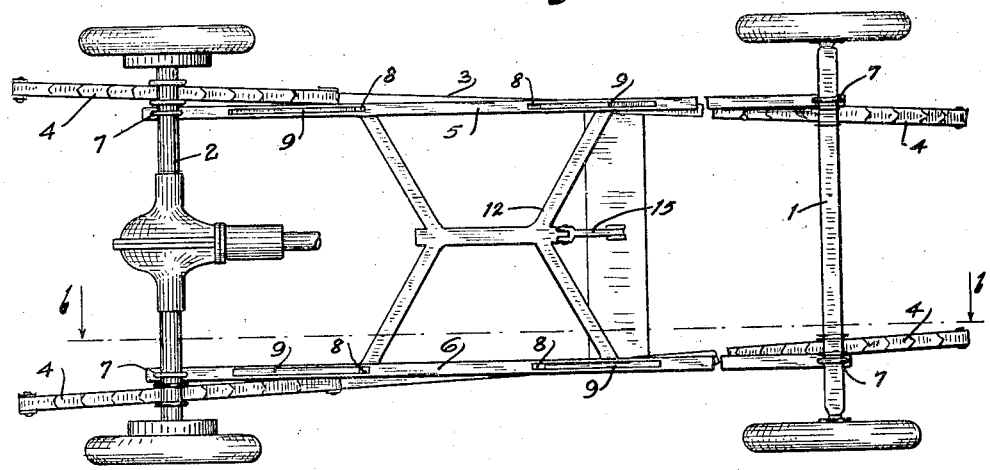
Fig. 3 is a bottom plan view looking in the direction of arrow 3, in Fig. 1.

Numerals 1 and 2 represent the front and rear axles, respectively, of an automobile chassis. The chassis frame 3 is connected to the axles by the ordinary springs 4. Two parallel bars 5 and 6 are secured at their ends to the ends of the axles 1 and 2 by any suitable means, such as the U-bolts shown and indicated by numerals 7. These bars are each provided with two longitudinal slots 8 within which are pivotally mounted the legs 9. These legs are pivoted at 10 and are of slightly greater length than the distance down to the ground so that when they are in the position shown in Fig. 2, they practically carry the entire weight of the car. The upper ends 11 of the legs are somewhat curved and to these curved ends I pivotally secure a framework 12. When the frame 12 is moved rearward from the position shown in Fig. 1, the legs 9 will be rotated counter-clockwise into the position shown in Fig. 2. For the purpose of permitting the driver to move the frame 12 and the legs 9, I have provided a lever 13 pivoted at 14. The lower end of this lever is connected to the frame 12 by means of a short connecting rod 15. It is now evident that by means of the lever 13 the position of the legs 9 can be controlled. A quadrant 16 is provided with notches that cooperate with a pawl (not shown) controlled by the lever 17 in the manner common and well known. When the car is moving, the parts are kept in the position shown in Fig. 1. In case the machine should start moving backwards or if for any other reason additional braking resistance is required, the lever 13 is moved forward to the position shown in Fig. 2, when the ends of the legs will be brought into contact with the ground.

It is evident that my mechanism will positively prevent rearward motion of the machine and that it will offer a resistance to forward movement that is dependent on the pressure applied to the lever 13.

I want it understood that the mechanism described above is illustrative only and that I contemplate modifying the same with the scope of the appended claim.

Having now described my invention, what I claim as new is:

An emergency brake mechanism adapted to be applied to an automobile, comprising a pair of spaced substantially parallel bars adapted to be secured to the axles of an automobile, each bar having two levers pivotally attached thereto at spaced points, said levers being bent at the pivot point, a framework secured to the upper bent ends of said levers whereby they may be moved about their pivots, and means comprising a lever for moving said levers and said framework.

In testimony whereof I affix my signature.

SHICHIGORO KUNO.